United States Patent [19]

Ernster et al.

[11] 4,176,971
[45] Dec. 4, 1979

[54] MULTI-PURPOSE KITCHEN APPLIANCE

[75] Inventors: Peter J. Ernster, Glendale; George H. Schaefer, Wauwatosa, both of Wis.; Michael G. Neal, Hixson, Tenn.

[73] Assignee: Sunbeam Corporation, Chicago, Ill.

[21] Appl. No.: 925,735

[22] Filed: Jul. 19, 1978

[51] Int. Cl.² .............................................. B01F 7/32
[52] U.S. Cl. ...................................... 366/298; 366/69
[58] Field of Search ................ 366/129, 69, 94, 95, 366/97, 298, 299, 300, 301, 344, 297, 601

[56] References Cited

U.S. PATENT DOCUMENTS

| | | | |
|---|---|---|---|
| 1,759,137 | 5/1930 | Sartor | 366/95 |
| 2,605,085 | 7/1952 | Gerry | 366/344 |
| 3,198,490 | 8/1965 | Jepson | 366/344 |
| 3,342,459 | 9/1967 | Myers | 366/299 |
| 3,746,267 | 7/1973 | Myers | 366/298 |
| 4,071,789 | 1/1978 | Ernster | 366/300 |

Primary Examiner—Robert W. Jenkins
Attorney, Agent, or Firm—George R. Clark; Neil M. Rose; Clifford A. Dean

[57] ABSTRACT

A multi-purpose kitchen appliance having two pairs of output spindles with each pair being driven at different preselected speeds, one pair of said spindles having dough hook receiving bores and the other pair having mixing beater receiving bores, a turntable-supported bowl with said dough hooks and said mixing beaters being selectively disposed in said bowl for mixing material therein, interlock means preventing simultaneous driving engagement of said dough hooks with their spindles and said mixing beaters with their spindles, and means for selectively ejecting said dough hooks and said mixing beaters from said pairs of spindles.

13 Claims, 7 Drawing Figures

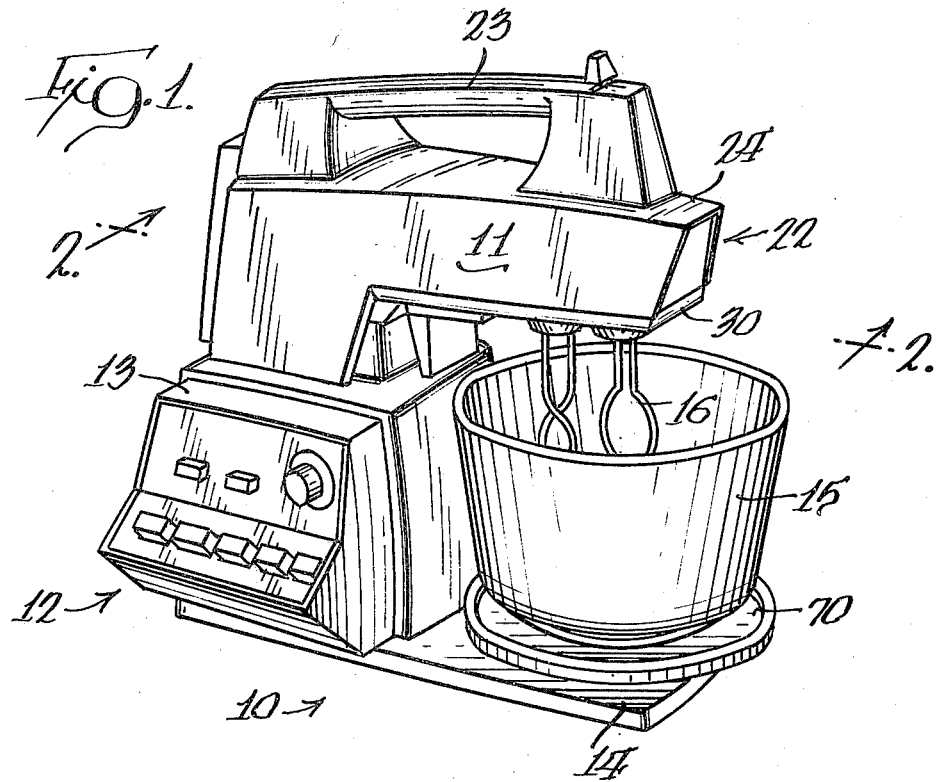
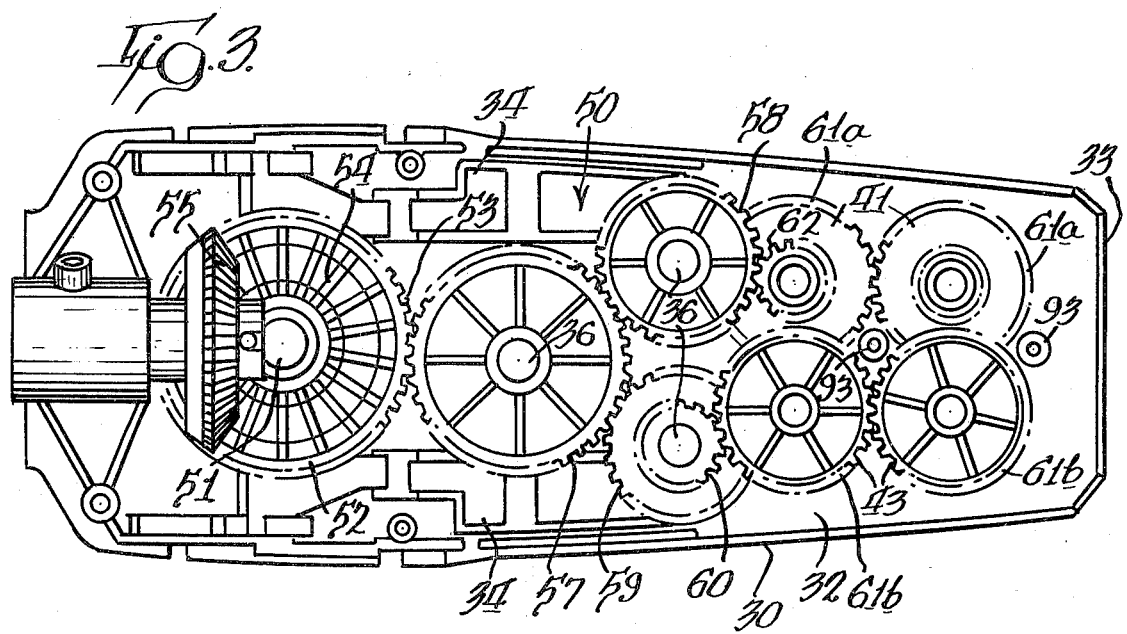

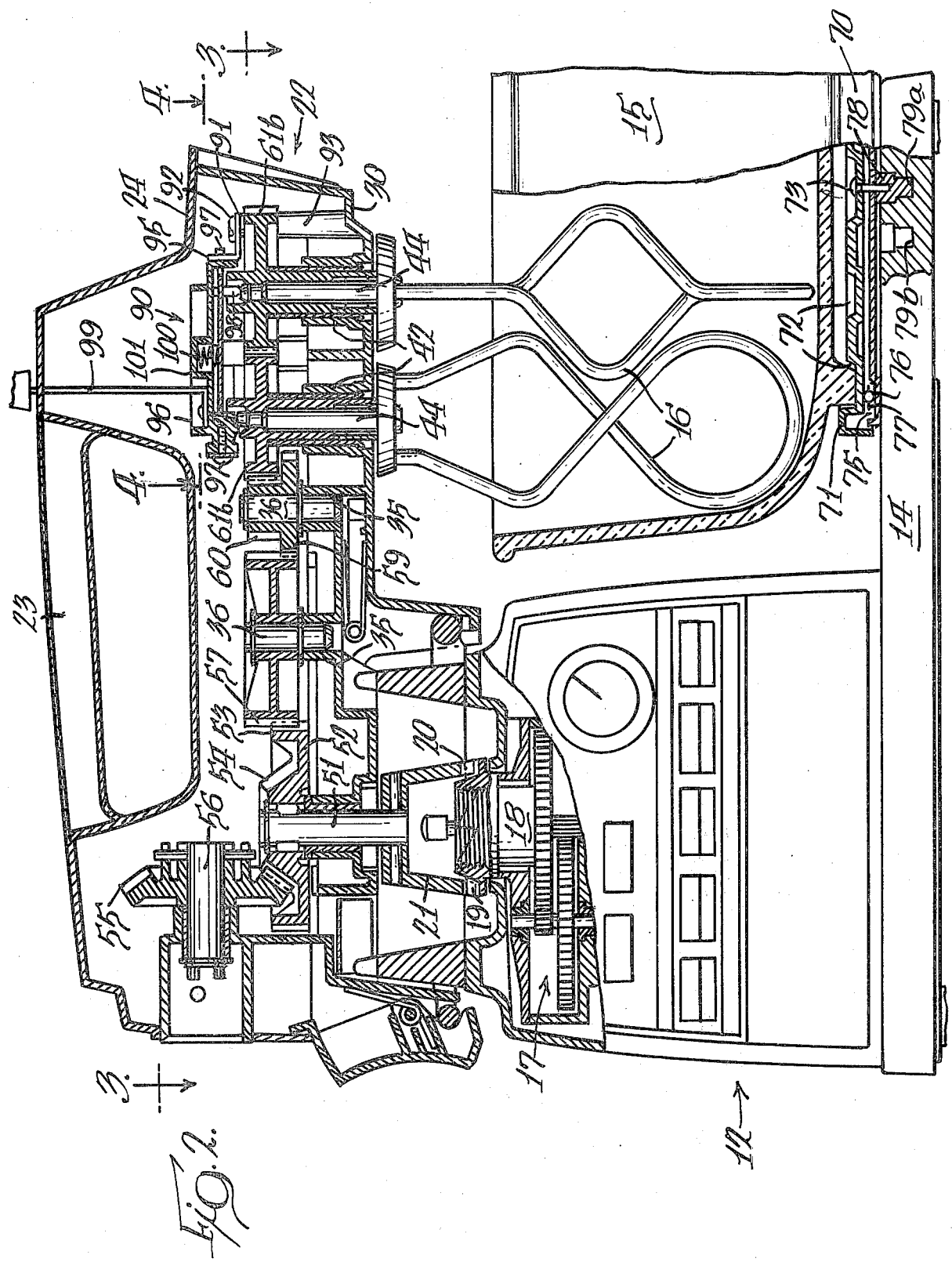

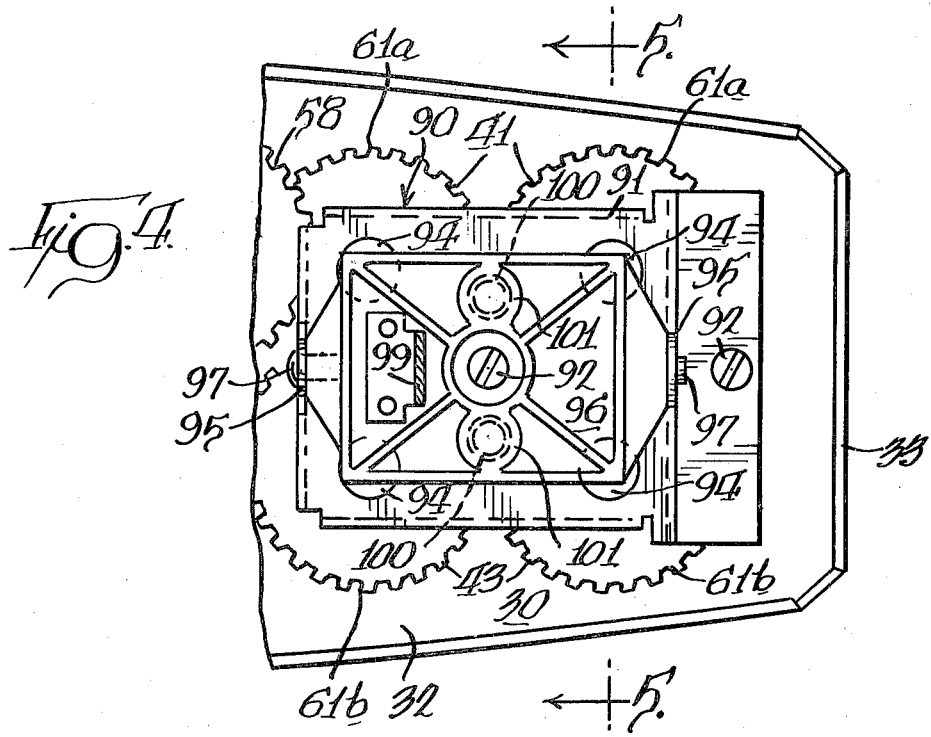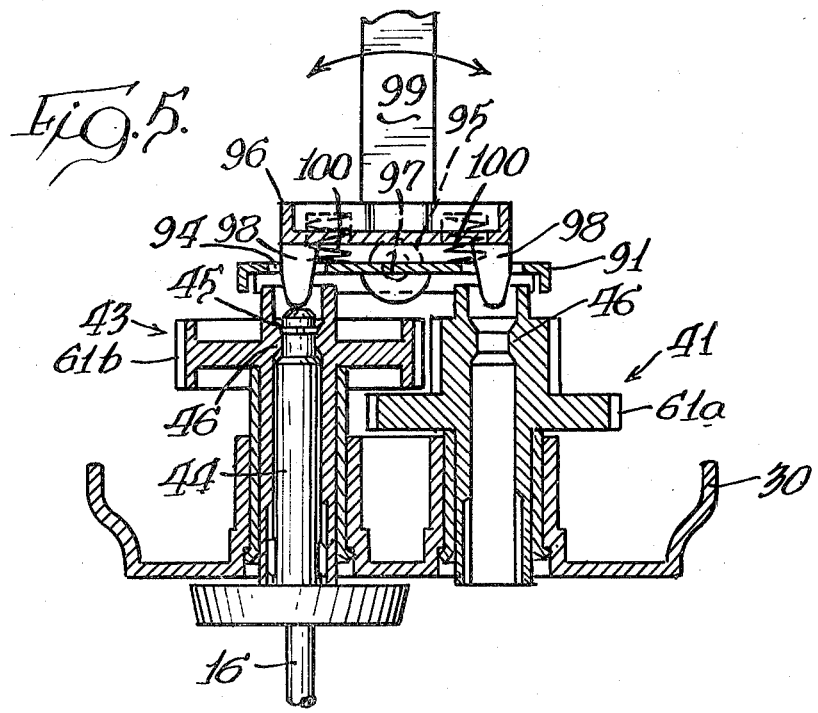

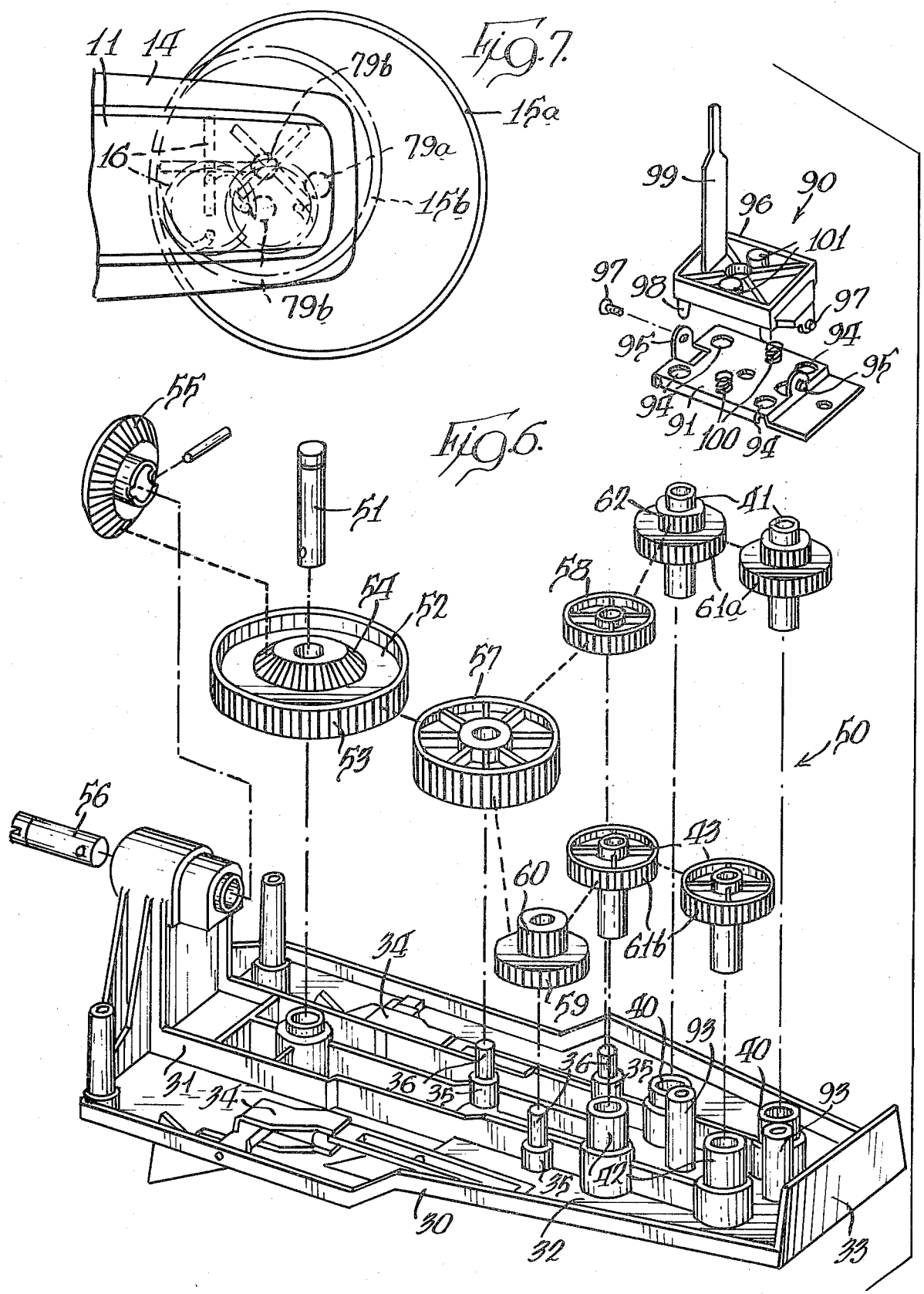

MULTI-PURPOSE KITCHEN APPLIANCE

BACKGROUND OF THE INVENTION

In the development of counter top appliances for the kitchen, it has been found that to perform the various processes such as mixing, blending, chopping, juicing, and the like, which are necessary to prepare many of the foods now consumed in the home, there is a preference for the multi-purpose appliance. Such appliances are of the type which may be easily converted to perform a number of different functions by interchangeably mounting separate appliance accessories to a common base or power unit. Their advantages are apparent, particularly where the storage or work areas of the kitchen are modestly sized making it difficult to use a separate appliance for each operation.

It has further been found that in order for the multi-purpose appliance to be favorably received by the consumer it must be economically priced and must perform its functions substantially as effectively as the appliances available for performing the same functions separately. In this regard, significant difficulties exist in providing the versatility needed in the areas of power, torque, and speed of operation, to incorporate the many functions into a single and efficient appliance. An example of a multi-purpose appliance having such capabilities is disclosed in Ernster et al, U.S. Pat. Nos. 3,951,351 and 4,071,789.

The multi-purpose appliances of the type disclosed in the above-cited Ernster et al patents have proved to be economical and quite effective in the mixing, blending, chopping and juicing of foods. The power unit is provided with a variable speed control so that a wide range of speeds are available for the various accessary appliances. Mixing or beating of food ingredients is accomplished by a mixing head which comprises a gear train for driving appropriate beater members in an arrangement which appears somewhat similar to conventional mixing appliances. Since the speed of the beaters may be selectively controlled by adjusting the power of the base unit, a number of mixing tasks may be performed with desirable results.

Notwithstanding the facility with which these appliances operate, it would be desirable to increase their versatility still further. The trends in food preparation today are such that an appliance is needed which performs all of the aforementioned functions, and in addition, is suitable for the kneading of dough. With the increasing preference for natural foods and foods of a homemade freshness and quality, it is becoming more common to find baked goods such as bread, pastries, and the like, being prepared in the home. The conventional multi-purpose appliance has been relatively unsuccessful in coping with this additional task. Although conventional dough hooks, for example, could be used with such appliances as the type disclosed in the above-mentioned Ernster et al patents, difficulties arise, again by virtue of the specific mechanical requirements of the process, making present-day multi-purpose appliances generally inefficient when used for kneading bread dough.

To understand the specific requirements of the kneading process, it is necessary to briefly consider the technique involved in making dough with the use of an electric mixing appliance. A preferred method of making dough begins by mixing the ingredients first with only a small amount of flour. This allows for a uniform distribution of yeast cells throughout the dough and permits one to use relatively high speed beaters while the dough is thin in consistency. It is then necessary to add the balance of the flour by kneading in order to assure that this uniformity of yeast distribution is maintained. Although the kneading can be done by hand, it is preferred that an electric mixer, equipped with conventional dough hooks, be used. In order to do so, however, it is necessary that the speed of the mixer be reduced so that the dough can be turned and folded as it becomes thickened in consistency. The problem involved is that by lowering the speed of the normal multi-purpose appliance, the power of the drive unit is correspondingly reduced and the dough hooks then lack sufficient torque to maintain a steady kneading action. In addition, though this problem could be overcome by constructing an appliance having a more powerful drive unit, such a solution would greatly increase the physical size and cost of the appliance, and would render it substantially less desirable to the consumer.

Other multi-purpose appliances are disclosed in the Strauss et al U.S. Pat. No. 2,278,187; in Schottle U.S. Pat. No. 2,801,545; and in Moore U.S. Pat. No. 2,685,435; which each show combination blender and mixer appliances that could be selectively used for the kneading of dough. It would be desirable, however, to provide a more effective multi-purpose appliance which overcomes the aforementioned difficulties without sacrifice of its economy and convenience.

SUMMARY OF THE INVENTION

The present invention involves a multi-purpose kitchen appliance and more particularly an appliance which is adaptable for kneading dough with a high efficiency and is adapted to perform with similar efficiency as a food mixer, blender, juicer, food chopper or the like. A base unit having an upright motor housing and a laterally extending platform for supporting a mixing bowl, provides a variable speed power unit for alternatively usable apparatus to perform the functions of the appliances noted above.

The mixing and kneading functions are performed by a mixing head which has an appearance similar to that of the body of a conventional mixer, but which has dual pairs of spindles that may be employed alternatively to accept conventional beaters or dough hooks and perform either function as desired. The mixing head is attachable to the base in a pivoting manner which permits engagement of a drive coupling with the power unit. The coupling, in turn drives a gear train which provides power input to both sets of spindles, one of which sets is driven at a substantially slower rate of speed than the other.

In accordance with the present invention, when the motor is operating at full power, the slow speed spindles are geared to rotate at a speed which is most suitable for the kneading of dough, while the alternative spindles are geared to provide the conventional high speeds which have been found preferable for beating or whipping other types of foods. Since the slow speed may thus be selected without lowering the power of the motor, greater torque is available at the dough hooks than would be available if conventional high speed spindles were used at low motor speed settings.

The differential in spindle speeds is accomplished by a gearing assembly which permits both spindle pairs to be mounted compactly within a narrow housing of conventionally shaped appearance. Each spindle pair is thus aligned along, and in close proximity to, the longitudinal centerline of the mixing head. A mixing bowl is detachably positionable along the same centerline at a predetermined distance with respect to the spindles, allowing the rear beater, or alternatively the rear dough hook, to be in close proximity to the inner wall of the bowl without requiring that the bowl be moved as the operator changes the mode of the mixing head between dough kneading and food beating. Food ingredients may thereby be dislodged from adherence to the walls of the bowl so that complete mixing is achieved.

Positioned above the spindles and gear assembly is an ejector mechanism which pivots transversely with respect to the longitudinal axis of the mixing head. A lever extends through the mixing head housing which may be actuated by the operator causing a pair of downwardly extending ejector pins to impart a downward force to the upper ends of the shafts of the beaters or dough hooks, and thereby eject them from their mounting positions within the spindles. In order to obtain the compact organization of the four spindles referred to above, it was necessary to mount the beater spindles so close to the dough hook spindles that the dough hooks and beaters would interfere with resulting damage if driven at the same time. In order to avoid such damage, the ejector mechanism is mounted above the spindles in such a manner that the insertion of any one mixing implement prevents the use of the opposite spindles, thus preventing the damage that would result from use of the dough hooks and beaters at the same time.

The object of the present invention is to provide an improved multi-purpose kitchen appliance having a mixing head with separate spindles for dough hook implements.

Another object of the present invention is to provide an improved multi-purpose kitchen appliance having separate beater and dough hook spindles which rotate at different speeds with respect to one another.

Still another object of the present invention is to provide an improved multi-purpose kitchen appliance having separate beater and dough hook spindles constructed within a mixing head assembly of conventional appearance and convenient light weight.

A further object of the present invention is to provide an improved multi-purpose kitchen appliance adapted for rotation of separate beater and dough hook implement pairs which when installed are oriented such that they dislodge food ingredients from adherence to the wall of the mixing bowl and the bowl position need not be altered as the mixing implements are interchanged.

Yet another object of the present invention is to provide an improved multi-purpose kitchen appliance with separate beater and dough hook spindles and having an ejector mechanism which is operable to eject either pair of alternative mixing implements.

A further object of the present invention is to provide an improved multi-purpose kitchen appliance with separate beater and dough hook spindles and having a mechanism which prevents the insertion of mixing implements into any pair of spindles which are dissimilar in function.

Yet a further object of the present invention is to provide an improved multi-purpose kitchen appliance having separate beater and dough hook spindles and having a single mechanism which operates both to eject the mixing implements and also prevent the insertion of mixing implements into any pair of spindles which are dissimilar in function.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a multi-purpose kitchen appliance embodying our invention;

FIG. 2 is an enlarged view partially in section taken on line 2—2 of FIG. 1;

FIG. 3 is a sectional view of the mixing head taken substantially on line 3—3 of FIG. 2;

FIG. 4 is a fragmentary sectional view of the forward end of the mixing head with the ejector mechanism shown substantially in plan view;

FIG. 5 is a partial sectional view of the mixing head taken on line 5—5 of FIG. 4 showing the ejector mechanism substantially in elevational view;

FIG. 6 is an exploded perspective view of the base casting and gear train of the mixing head; and FIG. 7 is a fragmentary plan view of the mixing head and base showing the relationships between the mixing elements and bowls of various sizes in schematic form.

Referring to FIGS. 1 and 2, there is shown a multi-purpose appliance designated generally by reference numeral 10, comprising a mixer head 11 and base unit 12. The base 12 includes an upright power unit housing 13 and an integrally formed platform portion 14 extending laterally therefrom. The platform portion 14 of the base 12 further provides support for a mixing bowl 15 which may be of a size and type suitable to the desired mixing operation to be performed through the use of appropriate mixing implements 16.

While there is shown in FIG. 2 a partial sectional view of a power unit taken through an upper portion of the power unit housing 13, it will be appreciated that the details of the power unit form no part of the present invention and accordingly the power unit has not been shown in full detail. Preferably, however, the power unit is of the type disclosed in the aforementioned patents to Ernster et al U.S. Pat. Nos. 3,951,351 and 4,071,789 comprising an electric motor with vertically disposed armature shaft and a speed reduction gear train, designated herein generally by reference numeral 17. Such a power unit includes an output shaft 18 which is connected at its upper end to a coupling member 19 having a plurality of peripherally disposed drive lugs 20 adapted for engagement with a cooperating coupling member 21 on the mixing head 11.

Turning now to the mixing head 11 and with reference to FIGS. 1 and 2, it is first noted that while the mixing head 11 bears some resemblance to the body of a conventional mixer by virtue of having an elongated housing 22 and an upper handle member 23, it nevertheless is intended to cooperate with a number of other appliances which may be selectively interchanged upon a power unit such as base 12, and accordingly, it does not require integral power means as in conventional mixer apparatus. It will thus be apparent from the description which follows that the mixing head 11 operates to convert the power provided by the base unit 12 to perform a multiplicity of household food preparation tasks, and at the same time allows base unit 12 to be employed to power other alternative food processing appliances. Thus through this arrangement, a highly versatile multi-purpose appliance is made possible.

In structure, the mixing head housing 22 is defined by an upper plastic cover 24 and a base frame 30 which is preferably of a die cast construction having suitable reinforcing ribs 31 as best shown in FIGS. 3 and 6. The frame 30 is generally similar to that which is disclosed in the aforementioned patents to Ernster et al U.S. Pat. Nos. 3,951,351 and 4,071,789, having a generally flat bottom wall 32 which is stepped upwardly at its forward end, and having a wall 33 which defines the front wall of the housing 22. As is disclosed in these same patents with considerable detail, there are provided in the instant invention latching means 34 fixed to the base frame 30 which enable the mixing head 11 to be supported in an upwardly pivoted inclination with respect to the base 12. At intermediate positions on the frame 30 there are provided a plurality of bosses 35 which support gear shafts 36.

In the design of household mixers, it is well known that desirable results can be achieved in the mixing of food ingredients by positioning conventional beater implements or dough hooks in a manner that permits them to rotate about spaced parallel axes in a pattern of overlapping circles when viewed in a plane which is normal to their axes of rotation. In accordance with the instant invention there are thus provided at a forward position on the frame 30, upwardly projecting bosses 40, each having an axial bore extending therethrough to provide support for rotatable beater spindles 41 so positioned to provide the desired overlapping of the beaters. As shown in FIG. 6, the bosses 40 are spaced lengthwise on the frame 30 and are displaced from the longitudinal centerline of frame 30 toward the far edge as viewed in FIG. 6. There are also provided bosses 42 which support for rotation dough hook spindles 43 and which position the spindles 43 so that the aforementioned desired overlap of the dough hooks may similarly be obtained. The bosses 42 are spaced lengthwise on frame 32 and displaced on the opposite side of the longitudinal centerline from the bosses 40 as best shown in FIG. 3.

As is apparent, particularly from FIG. 5, the beater spindles 41 and dough hook spindles 43 operate to retain the respective mixing implements 16 in a manner which is well known in the design of mixers. Each of the mixing implements 16 is provided with an end shaft 44 which loosely carries a split one turn locking spring 45 in an annular groove in the shaft 44. The spindles 41 and 43 are provided with axial bores extending therethrough and annular internal ridges 46 which first compress the locking springs 45 as the shafts 44 are inserted, and then allow the springs 45 to freely expand as they clear the ridges 46. Such an arrangement permits the mixing implements 16 to be firmly held in place and allows them to be easily ejected in a manner which is discussed below in detail.

It will be understood that there are provided, in accordance with the instant invention, multiple spindle pairs 41, 41 and 43, 43 which rotate at different speeds facilitating the use of a single power unit for alternative mixing and kneading food preparation processes. To appreciate the efficient and physically simple manner in which such spindle pairs are powered with differential speed of rotation, it is necessary to first consider the drive train 50 and the manner in which it is constructed within the confined space of the mixing head 11 shown herein. As is evident from FIGS. 3 and 6, the drive train 50 is of a well known type including spur gear members rotating in parallel planes. Connected to the aforementioned driven coupling 21 on the mixing head 11 is a drive shaft 51 journaled in a sleeve bearing received in an elongated boss formed in the base frame 30. The drive shaft 51 is fixed to a multiple drive gear 52 which includes an outer spur gear portion 53 and an inner recessed bevel gear portion 54. The bevel gear portion 54 of drive gear 52 engages a driven bevel gear 55 which is fixed to a horizontal power take-off shaft 56 extending from the rear of the base frame 30. The spur gear portion 53 of drive gear 52 engages an idler gear 57 which is supported for rotation on idler shaft 36a. The shafts 36 are rigidly connected to frame 30 as by a press fit engagement in openings in bosses 35 formed in frame 30.

Before considering the gears which drivingly relate the idler gear 57 with the spindles 41, 41 and 43, 43 it should be noted that each of the spindles 41, 41 and 43, 43 are provided with large spur gears 61 which interengage to the gear of the spindle of its respective pair, i.e. the gears 61a on the mixer beater spindles 41, 41 interengage, and the gears 61b on the dough kneading spindles 43, 43 interengage, so that the two spindles in each pair rotate at the same speed. The size of these gears is determined by the desired spacing of the mixer beater and dough kneading elements to accomplish the efficient mixing and kneading in the bowl 15. However, there must be clearance between the gears of the two pairs of spindles since one set runs at a much higher speed than the other and there can be no engagement under those conditions. In achieving the slim housing configuration desired, it has been necessary to space the beater spindles 41, 41 and the dough kneading spindles 43, 43 closer together than the diameter of the above discussed spindle gears; this has required overlapping the gears as shown in FIG. 5.

As is seen in FIG. 6 the thickness of idler gear 57 is such that it may engage both a beater drive gear 58 and a dough hook drive gear 59 simultaneously. A small spur gear 60 which is connected to the dough hook gear 59 engages the rear dough hook spindle gear 61b thus rotating the spindles 43 at a relatively slow rate of speed. At the same time, the rather large beater drive gear 58 engages a small spur gear 62 which is connected to the rear beater spindle gear 61a, and a relatively fast speed of rotation is thus imparted to the beater spindles 41. It is noted particularly from FIG. 3, that not only do the large spindle gears 61 overlap to effect a close spacing of the spindle pairs 41 and 43, but the beater drive gear 58 overlaps the rear beater spindle gear 61a and the rear dough hooks spindle gear 61b overlaps the dough hook drive gear 59. Such an overlapping relationship permits gear sizes to be chosen which create a substantial drive speed differential between the dough hook spindles 43 and the beater spindles 41 and, at the same time, allows all the gear members to be mounted within a slim housing having a conventional appearance.

The actual speed differential realized from this construction is preferably on the order of 5:1. Thus by employing a motor drive unit such as that disclosed in the aforementioned Patents to Ernster et al, U.S. Pat. Nos. 3,951,351 and 4,071,789, wherein the drive coupling, herein designated by reference numeral 18, rotates at a maximum no-load speed of on the order of 250

RPM, the beater spindles 41 of the instant invention rotate at a speed of 984 RPM while the dough hook spindles may rotate at 196 RPM. It is well known that such speeds are desirable maximum values for the mixing of food ingredients and the kneading of dough with conventional beaters and dough hooks respectively.

In order to support the mixing bowl 15 in a manner which will facilitate its rotation and thus contribute to thorough mixing of its contents, there is provided a turntable 70. As is best shown in FIGS. 1 and 2, the turntable consists of an upper plate member 71 having concentric annular grooves 72 which are so constructed as to selectively receive mixing bowls of various sizes. Upper plate member 71 is journaled by pin 73 for rotation about a lower plate member 74 having a peripheral annular groove 75 which provides a race for ball bearings 76. The ball bearings are held in a circular configuration by a conventional ball retainer ring 77. From FIG. 2, it will be particularly apparent that such an assembly permits the turntable 70 to rest firmly upon the platform portion 14 of the base 12 while allowing the mixing bowl 15 to rotate freely without tilting under the action of the mixing implements 16. As is discussed below in greater detail, to retain the turntable 17 in the desired position with respect to the beaters 16 and correspondingly to compensate the position of the turntable 70 for varying bowl sizes, there is provided as a downward protrusion from the lower plate member 74 a short cylindrical center stem 78 which may be selectively inserted into one of a plurality of holes 79 which are provided in the platform 14 of the base 12.

From the above description, it is clear that the mixing head 11 of the instant invention may be operated in a mixing mode wherein beaters of conventional design may be inserted in beater spindles 41, or alternatively, the mixing head may be operated in a dough kneading mode by the insertion of conventional dough hooks into dough hook spindles 43. It is also apparent that when the modes are changed from mixing to kneading, or conversely, the alignment of the respective mixing implements will correspondingly be altered with respect to a stationary mixing bowl member. In this connection, it is well known in the design of conventional household mixers that by orienting the beater or dough hook pair so that one of the beaters or dough hooks, respectively, is in close proximity to the wall of the mixing bowl, the contents of the bowl are most effectively dislodged from adherence to the bowl and the mixing or kneading process is enhanced. To effect this preferred orientation where alternative spindles may be selectively employed, it will be noted from FIGS. 3, 4 and 5 that in accordance with the instant invention the spindle pairs 41, 41 and 43, 43 are located on the base frame 30 of the mixing head 11 in such a way that they are parallel to and equidistant from the longitudinal centerline of the mixing head 11. At the same time, the spindle pairs 41, 41 and 43, 43 are equidistant from the forward end of the mixing head housing 22. As a consequence of this symmetrical positioning of spindles, the mixer bowl 15 may be placed in a single position on the base 12, along the same longitudinal centerline as that of the spindles, and repositioning of the bowl 15 will thereby be unnecessary in order to accommodate the above-mentioned preferred orientation of beater implements as the mode of the mixing head 11 is changed from mixing to kneading. It is also noted that although the spindle pairs 41 and 43 are spaced away from the centerline of the mixing head 11, such spacing has been minimized so that when the bowl 15 is positioned on the centerline of the appliance, the beaters are effective to mix ingredients which are at the center of the bowl 15.

Of course, such a relationship of the mixing bowl to the dough hooks and beaters depends in part upon the diameter of the bowl. Accordingly, there is provided, as is seen in FIGS. 2 and 7, a positioning hole 79a for the turntable 17 which permits a large bowl to take advantage of the aforementioned preferred relationship wherein the wall of the bowl 15a is in close proximity to either the rear doughhook or rear mixing beater as selected. Where it is desired that a small bowl 15b be used, there are also provided as best seen in FIG. 7, positioning holes 79b which permit selective placement of the turntable 70 so that the same relationship of mixing implements to the wall of the bowl may be achieved for a bowl 15b of reduced diameter. The holes 79b are also spaced outwardly from the centerline of the platform 14 so that the forwardly mounted mixing implements 16 will be effective to mix ingredients which favor the center of a small bowl 15b.

In order to selectively release either the beaters or the dough hooks, regardless of which of these implements are in place in their respective spindles, there is provided an ejector mechanism, generally designated by reference numeral 90. As is shown in FIGS. 2, 4, 5, and 6, the ejector mechanism 90 comprises a plate 91 which is secured by suitable fastening means 92 to upstanding support posts 93 cast into the base frame 30 of the mixing head 11. The plate 91 is centrally positioned above the spindles, and apertures 94 in the plate 91 are disposed in such a way as to be centered over each of the spindle bores, as best shown in FIG. 5. Upwardly extending ears 95 are provided on the longitudinal centerline of the plate 91 supporting an ejector frame 96 for pivotal movement on an axis aligned with the centerline of the mixing head 11 by suitable pins 97. The ejector frame 96 is provided with downwardly projecting ejector pins 98 at its four corners and a lever 99 which extends through the upper cover 24 of the mixing head 11. By actuating the lever 99 transversely with respect to the major axis of the mixing head 11, the ejector pins 98 on one side or the other of the ejector frame 96 are caused to move through their corresponding apertures 94 and thereby force either both beaters or both dough hooks, as chosen, out of engagement with their associated spindles. To bias the lever 99 to an upright position when the beaters and dough hooks are removed from the mixing head 11, springs 100 are provided which bear against the plate 91 from spring retainer cups 101 molded into the ejector frame 96.

As is stated above, the mixing and kneading modes of the instant invention operate in such a manner as to be alternative modes. In this connection, it would not, of course, be necessary or desirable to both mix and knead the same ingredients at the same time. Thus in accordance with the instant invention and with particular reference to FIG. 5, it is seen that the mounting elevation of the ejector frame 96 above the spindles 41 and 43 as well as the length of the ejector pins 98 are such that when either the beaters or the dough hooks are inserted into place, they abut with their corresponding ejector pins causing the ejector frame 96 to be pivoted slightly from a horizontal position. In this manner, the opposite ejector pins are caused to move into the upper ends of the alternative spindles and thereby prevent the insertion of one or both of the alternative mixing implements. It is appreciated that by providing such an ejector mechanism, beaters and dough hooks cannot be used simultaneously nor can mixing implements be inadvertently inserted into an unlike spindle pair. Thus the aforementioned advantages of constructing the spindle pairs 41, 41 and 43, 43 so as to be close to the centerline of the mixing head are not outweighed by the danger of destroying the mixing implements by inadvertently inserting interferring elements. Such an ejector mechanism is also simple in construction and performs reliably throughout many operations.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. In a multi-purpose kitchen appliance, the combination comprising a power unit, a housing enclosing and supporting a gear train which is driven by said power unit, said gear train including reduction gearing driving a pair of output spindles at speeds having a preselected different ratio to each other, said spindles being mounted in said housing for rotation about parallel spaced axes and having implement receiving bores the axis of each of said bores being coincident with said axes of rotation of said spindles, a mixing element insertable into one of said bores for driving connection with one of said spindles, a mixing element insertable into the other of said bores for driving connection with the other of said spindles, means supporting said housing and a bowl with said mixing elements disposed in said bowl for mixing material therein, said mixing elements being spaced around the periphery of said bowl and both being positioned closely adjacent the wall of said bowl for thorough mixing of said material therein.

2. In a multi-purpose kitchen appliance, the combination comprising a power unit, a housing enclosing and supporting a gear train which is driven by said power unit, said gear train including reduction gearing driving two pairs of output spindles, the first of such pairs having both spindles rotating at the same speed and rotating at a lower speed than the second of such pairs of spindles, the spindles of said second pair also rotating at the same speed, said spindles being mounted in said housing for rotation about parallel spaced axes and having implement receiving bores the axis of each of said bores being coincident with said axes of rotation of said spindles, said first pair of spindles receiving and driving a pair of dough hooks and said second pair of spindles receiving and driving a pair of mixing beaters, means supporting said housing and a bowl with said dough hooks and said mixing beaters disposed in said bowl for mixing material therein.

3. The combination of claim 2 wherein said dough hooks and beaters are mounted in said housing with respect to said bowl whereby one of said dough hooks or one of said beaters is disposed in closely spaced relation to the wall of said bowl and the other dough hook or beater is disposed in the central portion of said bowl so that the pair of dough hooks and the pair of mixing beaters will thoroughly mix the contents of the bowl.

4. The combination of claim 2 wherein the axes of said first pair of spindles and the axes of said second pair of spindles define spaced parallel planes, said means supporting said bowl including a rotary turntable for said bowl, said bowl being rotatable on said turntable about an axis which is parallel to and midway between said spaced parallel planes.

5. In a multi-purpose kitchen appliance, the combination comprising a power unit, a housing enclosing and supporting a gear train which is driven by said power unit, said gear train including reduction gearing driving a pair of output spindles at speeds having a preselected different ratio to each other, said spindles being mounted in said housing for rotation about parallel spaced axes and having implement receiving bores the axis of each of said bores being coincident with said axes of rotation of said spindles, a dough hook insertable into one of said bores for driving connection with one of said spindles, a mixing beater insertable into the other of said bores for driving connection with the other of said spindles, means supporting said housing and a bowl with said dough hook and said mixing beater disposed in said bowl for mixing material therein, interlock means associated with said spindles to prevent simultaneous driving engagement of said dough hook and said mixing beater with their respective spindles.

6. The combination of claim 5 wherein said interlock means includes a pivotally mounted member having projections extending into said bores in said spindles, mounting of one of said dough hook or beater into its respective spindle causes engagement of said one dough hook or beater with one of said projections pivoting said member and positioning the other of said projections within the other of said spindles so as to prevent driving engagement in the other of said spindles of said dough hook or beater.

7. A mixing appliance comprising a stand supporting a transversely extending elongated housing having one end connected to said stand and the other end extending above a lateral extension of said stand, a rotary bowl supporting turntable mounted on said extension and adapted to support a bowl for rotation about a vertical axis, said housing supporting in said other end two pairs of drive spindles in side by side relationship, means in said housing for driving a first of said pairs of spindles at a greater speed than the second of said pairs, each spindle of said first pair of spindles driving a mixing beater which is removably mounted in one of said first pair of spindles and rotatable about a vertical axis, each of said second pair of spindles driving a dough hook which is removably mounted in one of said second pair of spindles, and rotatable about a vertical axis, said beaters or said dough hooks being disposed in said bowl to mix all of the contents thereof as said bowl and said spindles rotate.

8. The mixing appliance of claim 7 wherein the axes of said first pair of spindles and the axes of said second pair of spindles define two spaced parallel planes which are equidistant from the axis of rotation of said bowl.

9. The mixing appliance of claim 8 wherein one of said dough hooks and one of said mixing beaters is positioned closely adjacent the wall of said bowl and the other of said dough hooks or mixing beaters are disposed toward the center of said bowl to mix the contents completely.

10. The mixing appliance of claim 7 including ejector means for displacing said dough hooks and mixing beaters from driven engagement with said spindles, said ejector means comprising a frame having four projections engageable with said dough hooks and beaters and being mounted for pivotal movement with respect to said housing, engagement of either said dough hooks or said beaters with their respective spindles causing said frame to be pivoted from its rest position by engagement with said projections, in said pivoted position said projections preventing insertion of said other beaters or dough hooks into driving engagement with their respective spindles.

11. The mixing appliance of claim 10 wherein said ejector means includes a manually operable lever secured to said frame and extending outwardly of said housing, actuation of said lever in one direction causing ejection of said dough hooks and in the other direction causing ejection of said beaters.

12. In a food mixing appliance, the combination comprising a support member which supports for rotation a pair of implement mounting spindles, one of said spindles being adapted to detachably support a first mixing implement and the other to detachably support a second mixing implement, each spindle having a bore extending therethrough, each said bore being coaxial with the axis of rotation of said spindle, said mixing implements having attachment means engageable with said spindles to retain them in driven engagement therewith, a frame member mounted on said support member perpendicular to the plane defined by the spindle axes, said frame member overlying said spindles and having projections aligned with said bores, actuating means permitting manual movement of said frame member, said projections engaging either of said first or second implement so that said first and second implement may not be drivingly engaged with said spindles at the same time.

13. The mixing appliance of claim 12 wherein the frame member pivots with respect to said support member so that said first mixing implement or said second mixing implement may be ejected from said spindles, said mixing implements being engaged with said spindles by detent means, and said frame member being biased to a rest position spaced equidistant from said spindles when said mixing implements have been ejected.

* * * * *